Dec. 23, 1952 A. W. PAYNE 2,622,488
WORK HOLDER
Filed March 12, 1948
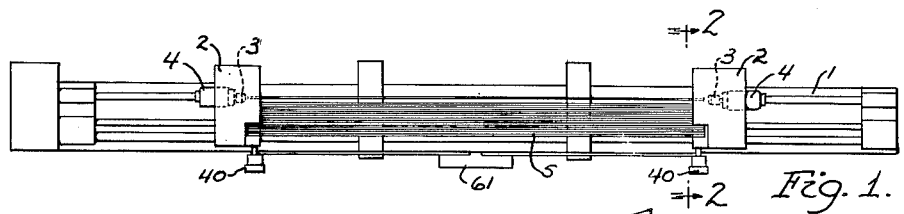
Fig. 1.
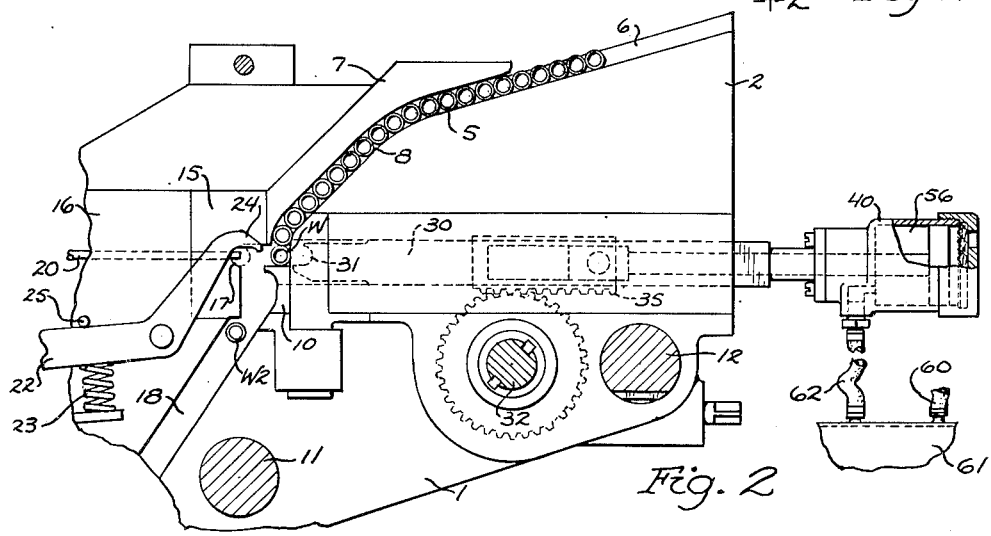
Fig. 2.
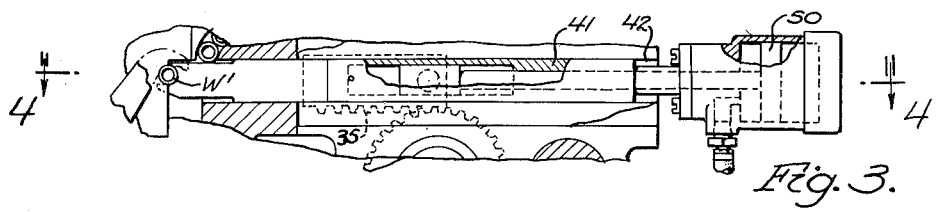
Fig. 3.
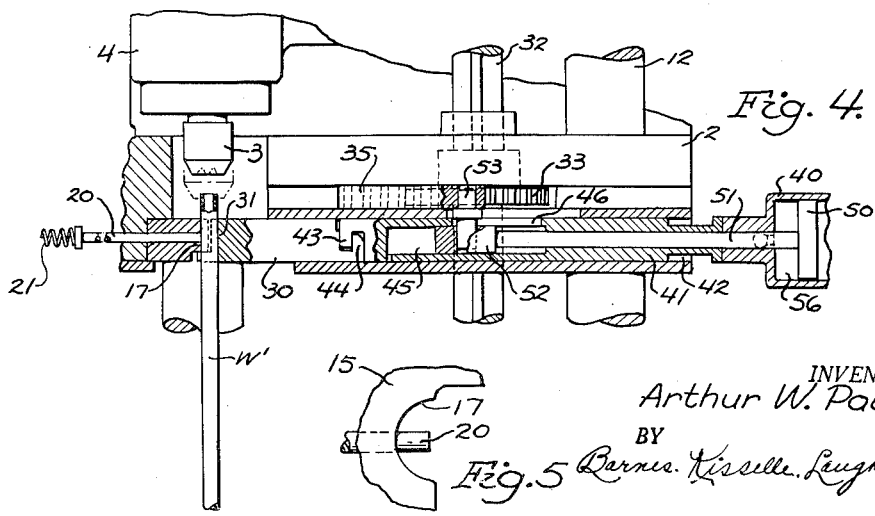
Fig. 4.
Fig. 5.
INVENTOR.
Arthur W. Payne
BY
Barnes, Kisselle, Laughlin & Raisch
ATTORNEYS.

Patented Dec. 23, 1952

2,622,488

UNITED STATES PATENT OFFICE 2,622,488

WORK HOLDER

Arthur W. Payne, Detroit, Mich., assignor to Bundy Tubing Company, Detroit, Mich., a corporation of Michigan Application March 12, 1948, Serial No. 14,436

3 Claims. (Cl. 90—59)

This invention relates to a machine for performing operations on work pieces where the work piece is to be clamped and held positioned. More specifically, the invention is concerned with a machine where the operations performed tends to rotate the work piece and the work piece is to be clamped strongly to prevent such rotation.

An example of a machine of the present invention is one for burring the ends of tubing. In some machines of this character lengths of tubing are successively fed into position and a rotary burring device is applied to one or both ends of the tube to remove burrs or other rough portions while the tube is held against rotation. The burrs referred to may be those which are the result of sawing long lengths of tubing into shorter lengths. When the rotary burring tool is applied to the tube, the tube must be strongly held to prevent its rotation. Some of such machines have a number of automatic actions and a succession of tube lengths are fed rather rapidly and the burring operations performed rapidly with the result that the clamping means must be quickly applied to the tube and then removed in order to engage the next following tube.

Some yielding characteristics must be embodied in the clamp so that the tube can be efficiently clamped without distorting or marring the same and heretofore a spring element has been embodied in the clamp. This has not proved satisfactory, however, because when the clamp is applied to the tube the clamping pressure is relatively light and the clamping pressure builds up as the automatic mechanism is moving, the build up in the clamping pressure being substantially that of the rate of spring compression. In the meantime, however, the burring tools have been applied to the tube and it often occurred that the tube would be rotated in the clamp before the clamp was applied with full pressure. This marred the surface of the tube in an undesirable manner.

The present invention aims to provide an arrangement in a machine of this character where the tube is clamped with an initial adequate pressure and yet a yielding action is obtained with the pressure of the clamping action building up after the initial engagement. To this end, an air cushion arrangement is provided where the air of the cushion is maintained under a desirable pressure, this being the pressure instantly active when the clamp is applied to the tube.

A machine constructed in accordance with the invention is disclosed in the accompanying drawings:

Fig. 1 is a top plan view showing a part of such a machine and indicating a plurality of tube lengths being fed to rotary burring devices.

Fig. 2 is an enlarged sectional view taken substantially on line 2—2 of Fig. 1 showing the clamping dies and the tubes as they are fed thereto.

Fig. 3 is a view partly in section and with parts cut away showing the clamping mechanism illustrated in Fig. 2 and illustrating the same in clamped position.

Fig. 4 is a sectional view taken substantially on line 4—4 of Fig. 3 showing the dies in clamped position.

Fig. 5 is an enlarged detailed view of the fixed clamping die.

The machine, as shown in Fig. 1, has a frame structure 1 with spaced guides or feeding devices 2 and spaced burring tools 3, each driven by an electric motor 4. A plurality of lengths of tubing are indicated at 5. The ends of the several lengths of tubing rest upon the guides 2 and, as shown in Fig. 2, each guide has a recess or way 6 which is covered for a portion of its length by an element 7 thus providing a channel 8. The tubes are fed to the machine and are placed in the open portions of the ways 6 and then the tubes as illustrated at 5 gravitate through the channel with the lowermost tube illustrated at W coming to rest on a support 10 at the bottom of the channel.

The frame structure of the machine is, of course, subject to considerable variation and need not be further considered herein except to say that it may include crosswise extending tie rods 11 and 12 (Fig. 2).

There is a fixed clamping die 15 held in a supporting element 16 and provided with a recess or socket 17 spaced from and facing the location of the tube W, as will be seen by reference to Fig. 2. Extending downwardly from the space between the recess 17 and the location of the tube W is a discharge passage or channel 18. The fixed die is provided with an ejector 20 in the form of a rod forced into ejecting position by a spring 21 (Fig. 4). A lever 22 acted upon by a spring 23 has a hooked end 24 which aids in ejecting a finished length of tube and starts the tube in its movement through the outlet channel or passage 18. The spring 23 normally holds the lever against a suitable stop 25.

The movable clamping die is illustrated at 30 having a recess 31. This die is reciprocably mounted and is reciprocated by an oscillating shaft 32 having a gear 33 thereon. There is a slidably mounted rack 35, the teeth of which mesh with the gear 33 and this rack is coupled to the shiftable die 30 through the air cushion means.

The air cushion means embodies a cylinder 40 which is provided with an extension 41 reciprocably mounted in a guideway 42. This extension 41 of the cylinder has a hook-like element 43 which couples with a cooperating hook element 44 on the die 30. The extension 41 has a hollow interior 45 with a slot 46 opening into one side thereof. In the cylinder 40 is a piston 50 with a piston rod 51 slidably mounted in the extension 41 and with a head portion 52 operable in the hollow interior 45. A suitable coupling, in the nature of a pin 53, extends through the slot 46 and couples the rack 35 with the head of the piston rod.

A cushion of air is maintained in the cylinder and specifically in the space 56, which is between the piston and the end of the cylinder through which the piston rod 51 extends. For this purpose, the system of compressed air in a manufacturing plant may be piped to the cylinder. As shown in Fig. 2, a line 60 for compressed air is introduced into a tank 61 and a flexible conduit, such as a hose 62, is connected to the tank 61 and to the cylinder as illustrated. Thus, at all times, air under pressure is maintained in the cylinder. The tank 61 provides an adequate volume for compression of the air.

In the operation of the machine, a condition in the cycle may be considered as represented by the position of the parts shown in Fig. 2. The tube at W is in position to be clamped and worked upon. The shaft 32 oscillates thus shifting the piston 50 to the left as Figs. 2, 3 and 4 are viewed. Due to the air cushion in the cylinder, the cylinder is shifted to the left with its extension 41 sliding in the way 42 and advancing the die 30. The tube at W is engaged in the die recess 31 and it is supported by the underlying lip of the recess as the tube is shifted to the left, as Fig. 2 is viewed, and positioned in the recess 17 of the fixed die. The shifted position is shown in Fig. 3 where it will be noted that the tube next above the tube which was at the location W now rests upon the die member 31. In this shift of the tube, the lever 22 may be caused to rock slightly as the tube moves under its hooked end 24 and as the tube enters the die recess 17, the ejector pin 20 is pushed back against its spring 21.

Practically instantly, upon the tube being engaged in the die recess 17 and clamped therein by the die recess 31, the clamping pressure is equal to the pressure of the air cushion. The pressure of the air may vary depending upon the requirements. For example, in burring the ends of tubing of about ⅜" in diameter a pressure of about 80 pounds per square inch has been found to be satisfactory. Of course, the oscillating shaft 32 and the associated mechanism may continue to increase the packing pressure. This occurs as the piston continues to move to the left after the clamping die 30 and the cylinder come to rest thus compressing the air cushion and displacing some of it back into the tank 61. Thus the pressure increase due to such further compression of the air cushion will not be excessive. In other words, the body of air in the cylinder is not isolated and compressed in itself as some of it may be displaced and compressed in the tank 61.

In the normal operation of the machine, as soon as the clamp is applied, the burring tools 3, which are rotated by their electric motors 4, are advanced as shown by the dotted lines in Fig. 4, and in their rotary action perform a burring operation on the ends of the tube. The tube in clamped position is indicated at W' (Fig. 4). As soon as the burring operation is completed, the burring heads retract and the oscillating shaft 32 is reversed so that the parts are shifted back to the position shown in Figs. 3 and 4 to the position shown in Fig. 2. As the die 30 retracts, the ejector pin 20 is projected by its spring to thus eject the tube from the die recess 17 and the tube is engaged by the hooked end of the lever 22 thus being separated from the die recess 31 and caused to fall in the outlet channel 18 as shown at $W^2$. As soon as the die member 30 has retracted to the Fig. 2 position, the column of tubes shifts in the channel 8 and another tube is located at the position W. This completes the cycles and the machine is ready to repeat another cycle without any substantial delay and a sequence of cycles is repeated rapidly.

It will be understood that while the above description has been devoted to the description of the dies and to the related parts for acting upon one end of the tube, that where both ends of the tube are to be burred, as indicated in Fig. 1, the same structure is duplicated for the opposite end of the tube.

I claim:

1. In a machine having a tool for engaging and performing an operation on a work piece, a pair of clamping dies for clamping and holding the work piece therebetween, one of said dies being mounted for movement relative to the other so that work pieces may enter between the clamping dies and may be released therefrom, an actuator, a cylinder, a piston in the cylinder, the cylinder and piston being connected one to the actuator and the other to the movable die, a substantially unobstructed air pressure line connected into the cylinder and into an air pressure supply system for maintaining air under pressure therein, a tank in the air pressure line, the air under pressure providing a cushion action between the actuator and the movable die and providing a substantially instant clamping pressure when the movable die engages the work piece which substantially corresponds to the pressure of the air, the air in the cylinder and in the tank being compressed as the actuator moves subsequent to the movable clamping die engaging with the work piece.

2. In a machine having a tool for engaging and performing an operation on a round work piece such as a length of tubing and which operation tends to turn the work piece on its axis, a fixed clamping die, a movably mounted die, said dies arranged to clamp and hold a work piece therebetween and adapted to have work pieces entered therebetween and release therefrom when the movable die is retracted from the fixed die, an actuator for moving the movable die, and connections between the actuator and the movable die including a cylinder and a piston therein connected, one to the movable die and the other to the actuator, and an unobstructed air pressure line connected into the cylinder and into an air pressure supply system for maintaining air therein under a substantially determined pressure to provide a cushion action between the actuator and the movable die so that the movable die engages the work piece with substantially instant pressure as determined by the air pressure and so that the actuator may continue clamping action movement by compression of the air after the movable die has engaged the work piece.

3. In a machine having a tool for engaging and performing an operation on a work piece, a fixed clamping die, a slidably mounted clamping die, said clamping dies arranged to clamp and hold a work piece therebetween, the movable die being shiftable away from the fixed die so that work pieces may enter between and be released from between the clamping dies, a cylinder, a piston therein, means slidably mounting the cylinder, means connecting the cylinder to the movable clamping die, the piston having an extending piston rod, an actuator for reciprocating the piston, and an unobstructed air pressure line connecting into the cylinder and into an air pressure supply system for maintaining air under pressure therein to provide a cushion between the actuator and the movable clamping die, whereby initial contact of the clamping die with the work piece is accompanied by a substantially instant clamping pressure substantially corresponding to the pressure of the air in the cylinder.

ARTHUR W. PAYNE.

REFERENCES CITED

The following references are of record in the file of this patent:

UNITED STATES PATENTS

| Number | Name | Date |
|---|---|---|
| 806,464 | Cottrell | Dec. 5, 1905 |
| 1,279,972 | Berry | Sept. 24, 1918 |
| 1,862,668 | Eldridge et al. | June 12, 1932 |
| 2,225,127 | Oppenheim | Dec. 17, 1940 |
| 2,356,226 | Delahan et al. | Aug. 22, 1944 |